(12) United States Patent
Exoo et al.

(10) Patent No.: US 11,662,791 B2
(45) Date of Patent: May 30, 2023

(54) AUTOMATION NETWORK, INDUSTRIAL PERSONAL COMPUTER, HOUSING MODULE AND METHOD FOR MANUFACTURING INDUSTRIAL PERSONAL COMPUTER

(71) Applicant: OMRON Corporation, Kyoto (JP)

(72) Inventors: Frank Exoo, Hoofddorp (NL); Martijn Elias, Hoofddorp (NL)

(73) Assignee: OMRON Corporation, Kyoto (JP)

(*) Notice: Subject to any disclaimer, the term of this patent is extended or adjusted under 35 U.S.C. 154(b) by 502 days.

(21) Appl. No.: 16/979,851

(22) PCT Filed: Mar. 22, 2019

(86) PCT No.: PCT/IB2019/020003
§ 371 (c)(1),
(2) Date: Sep. 10, 2020

(87) PCT Pub. No.: WO2019/211670
PCT Pub. Date: Nov. 7, 2019

(65) Prior Publication Data
US 2021/0048866 A1     Feb. 18, 2021

(30) Foreign Application Priority Data
Apr. 30, 2018   (EP) ..................... 18170132

(51) Int. Cl.
*G06F 1/26*      (2006.01)
*G06F 1/28*      (2006.01)
(Continued)

(52) U.S. Cl.
CPC ............... *G06F 1/28* (2013.01); *G06F 1/181* (2013.01); *G06F 1/20* (2013.01); *G06F 1/30* (2013.01); *G06F 2200/1635* (2013.01)

(58) Field of Classification Search
CPC ... G06F 1/181; G06F 1/30; G06F 1/18; G06F 1/263; G06F 1/188; G06F 1/189;
(Continued)

(56) References Cited

U.S. PATENT DOCUMENTS 6,195,754 B1 * 2/2001 Jardine ..................... G06F 1/30
                                                                714/24
6,219,229 B1   4/2001 Lee
(Continued)

FOREIGN PATENT DOCUMENTS

CN     205028217 U    2/2016
DE     102016106245   10/2017
(Continued)

OTHER PUBLICATIONS

"International Search Report (Form PCT/ISA/210) of PCT/IB2019/020003", dated Jul. 1, 2019, thereof, pp. 1-5.
(Continued)

*Primary Examiner* — Mandeep S Buttar
(74) *Attorney, Agent, or Firm* — JCIPRNET

(57) ABSTRACT

According to a first aspect, an industrial personal computer (IRC) (100) is provided. The IPC comprises: •a first housing module (10) having a first electronic component, an internal electric power supply device and a first electric connection portion; and •a second housing module (20') having a second electronic component and a second electric connection portion, the first and the second housing modules being stacked along a stacking direction (SD), wherein the first and second connection portions form a connection bus along the stacking direction at least for transmitting electric power between the first and second housing modules; wherein •the second electronic component is an uninterruptible power supply (UPS) device (21); and •the IRC further comprising a power management controller (28).

20 Claims, 6 Drawing Sheets

Figure 1:
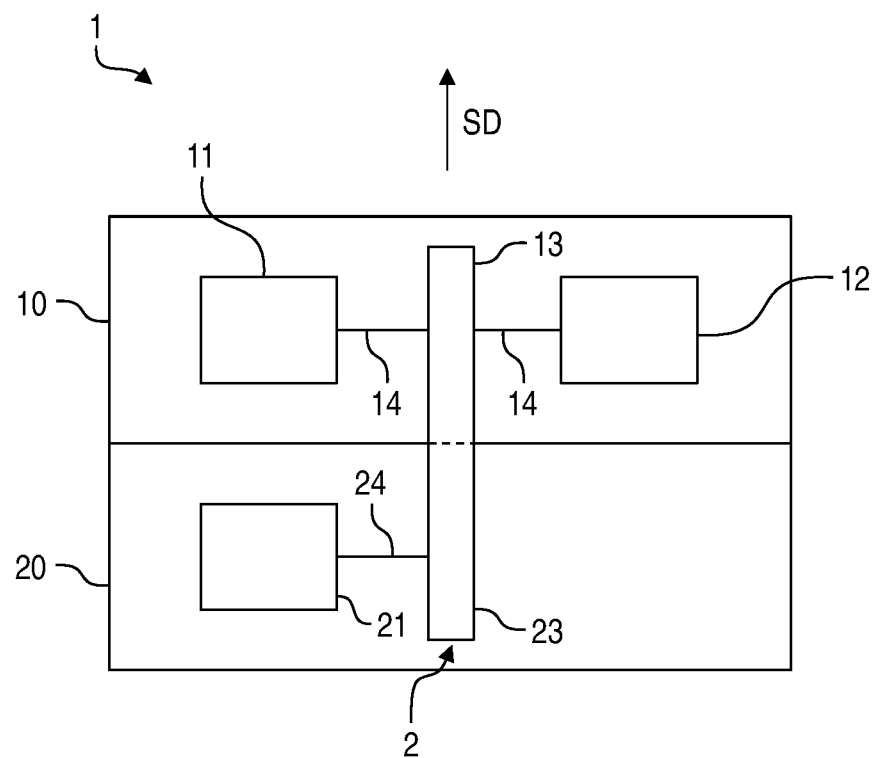

(51) Int. Cl.
*G06F 1/18* (2006.01)
*G06F 1/20* (2006.01)
*G06F 1/30* (2006.01)

(58) Field of Classification Search
CPC ...... G06F 1/26; G06F 1/28; G06F 2200/1635; H02J 9/06; H05K 5/0017; H05K 5/0021; H05K 7/1457; H05K 7/1492
USPC .................................................. 361/679.46
See application file for complete search history.

(56) References Cited

U.S. PATENT DOCUMENTS

| | | | |
|---|---|---|---|
| 7,403,379 B2 | 7/2008 | Rumney | |
| 2004/0008483 A1* | 1/2004 | Cheon | G06F 1/20 361/699 |
| 2006/0006739 A1* | 1/2006 | Gonzales | G06F 1/30 307/66 |
| 2010/0033923 A1 | 2/2010 | Copeland et al. | |
| 2010/0187908 A1* | 7/2010 | Okano | H02J 9/06 307/64 |
| 2010/0321885 A1* | 12/2010 | Huang | G06F 1/181 361/679.58 |
| 2012/0243160 A1* | 9/2012 | Nguyen | G06F 1/26 361/679.08 |
| 2015/0380968 A1* | 12/2015 | Lee | G06F 1/30 713/300 |
| 2017/0047772 A1* | 2/2017 | Wang | H05K 7/1492 |
| 2017/0358934 A1* | 12/2017 | Miller | G01R 19/16542 |

FOREIGN PATENT DOCUMENTS

| | | |
|---|---|---|
| JP | 2008245423 | 10/2008 |
| JP | 2009005488 | 1/2009 |
| JP | 2013192283 | 9/2013 |
| JP | 2014007930 | 1/2014 |
| JP | 2014204447 | 10/2014 |
| JP | 2015153022 | 8/2015 |
| JP | 2016096185 | 5/2016 |

OTHER PUBLICATIONS

"Written Opinion of the International Searching Authority (Form PCT/ISA/237) of PCT/IB2019/020003", dated Jul. 1, 2019, thereof, pp. 1-8.
"Office Action of Japan Counterpart Application" with English translation thereof, dated Oct. 4, 2022, p. 1-p. 17.

* cited by examiner

AUTOMATION NETWORK, INDUSTRIAL PERSONAL COMPUTER, HOUSING MODULE AND METHOD FOR MANUFACTURING INDUSTRIAL PERSONAL COMPUTER

CROSS-REFERENCE TO RELATED APPLICATION

This application is a 371 application of the International PCT application serial no. PCT/IB2019/020003, filed on Mar. 22, 2019, which claims the priority benefits of European Patent Application No. 18170132.7, filed on Apr. 30, 2018. The entirety of the above-mentioned patent application is hereby incorporated by reference herein and made a part of this specification.

The present invention relates to an industrial personal computer (industrial PC or IPC) and to a method for manufacturing an IPC.

Industrial PCs are often used in industrial environments, in particular in factory automation environments. In such environments, it can be desired that IPCs operate more reliably than standard PCs. In particular, it can be important to avoid undesired interruptions of the IPC.

Document US 2012/243160 A1 discloses an adaptive computing system providing a platform supporting multiple independent desktop computer modules.

Document CN 205 028 217 U discloses a stacked computer case comprising a plurality of stacked computer modules, for example including a host module, a heat dissipation module, a storage module, a power supply module and an uninterruptible power supply (UPS) module.

Document US 2010/0321885 A1 discloses a modular computer comprising a plurality of stacked units fixed together by fasteners. The units for example include a main board unit, a power supply unit, a CPU and the like.

Document DE 10 2016 106 245 B3 discloses a server device comprising several modules including a base module with a keyboard and a display, as well as at least an extension module. The base module and the extension module each have their own housing.

It is one object of the present invention to provide an improved IPC. A further object is the provision of an improved method for manufacturing an IPC.

Accordingly, the present invention provides an IPC and a method for manufacturing an IPC according to the independent claims Additional aspects of the invention are indicated in the dependent claims.

According to a first aspect, an industrial personal computer (IPC) is provided. The IPC comprises:
  a first housing module having a first electronic component, an internal electric power supply device and a first electric connection portion; and
  a second housing module having a second electronic component and a second electric connection portion, the first and the second housing modules being stacked along a stacking direction, wherein the first and second electric connection portions form a connection bus along the stacking direction at least for transmitting electric power between the first and second housing modules; wherein
  the second electronic component is an uninterruptible power supply (UPS) device.

The IPC can be used in an industrial environment, for example for controlling a production system. The first housing module may include the main components of the IPC, such as a motherboard and/or a central processing unit as the first electronic component. The first housing module may comprise a casing for holding the first electronic component, the internal electric power supply device and the first electric connection portion. The internal electric power supply device can be a battery of the IPC. In particular, the internal electric power supply device provides the IPC, particularly the first and/or second electronic components, with electric energy when the IPC is operating normally.

The second housing module may be an additional module of the IPC. In embodiments, the first and the second housing modules are removably stacked along the stacking direction. In the stacked position, the first and the second housing modules may be fixed to one another using screws, clamps or the like. The second housing module may comprise a casing for holding the second electronic component and the second electric connection portion.

The first and the second electric connection portions can be arranged such as to contact each other when the first and second housing modules are correctly stacked, thereby forming the connection bus. The connection bus can be used to transfer electric power and/or communication data between the first and the second housing modules. The first and/or second electric connection portions can be printed circuit boards.

The second housing module of the IPC can form an additional layer comprising the UPS device. The UPS device can comprise a UPS power supply, for example a UPS battery, and/or a control unit (power management controller) for controlling the same. The second housing module may be added to an existing IPC comprising the first housing module. Thereby, the functionalities of the IPC can be extended, in particular by adding the functionalities of the UPS device. By providing the IPC with the second housing module, the IPC can easily be provided with the UPS device. Thereby, the IPC can be improved.

According to an embodiment, the UPS device is configured to provide the IPC with electric power through the connection bus when the internal electric power supply device fails and/or is disconnected such that an interruption of the power supply of the IPC is prevented.

The UPS device can ensure that the IPC does not stop unexpectedly and that the IPC runs more reliably. In particular, the UPS device can take over the powering of the IPC when the internal electric power supply device stops operating and/or operates wrongly due to a failure and/or when it is disconnected from the IPC. The addition of the UPS device can allow the IPC to operate more reliably, which is in particular important in industrial environments, in which no failure of the IPC should occur. In particular, with the UPS device provided in the IPC, it can be made certain that no data is lost and it is ensured that a system controlled by the IPC, for example a production system, is operated correctly without interruptions.

In embodiments, the UPS device and the internal electric power supply device are connected such that electric power can be transmitted therebetween through the connection bus. For example, the UPS device can be charged by the internal electric power supply device. This may allow a reduction of wiring because no extra wiring needs to be provided to supply the UPS device with electric power.

According to a further embodiment, the IPC further comprises a power management controller implemented to:
  monitor the internal electric power supply device and/or an internal voltage at the connection bus;
  detect a presence of the second electronic component in the second housing module;

control a power distribution of the IPC such that during a removal or insertion of the second electronic component the internal electric power distribution remains unaffected;

to control a charging of the UPS device by the internal electric power supply; and/or to control a shutdown and/or boot operation of the IPC.

The power management controller can be provided in the second housing module. In embodiments, it is part of the UPS device. Alternatively, the power management controller can control the operation of the UPS device. For example, the power management controller manages the supply of electric power from the internal electric power supply device and/or from the UPS device to the IPC.

In particular, the power management controller monitors the internal electric power supply device and/or an internal voltage at the connection bus such as to determine whether the internal electric power supply device and/or the UPS device operate correctly. For example, the power management controller can detect that the internal electric power supply device is failing or disconnected and control the UPS device to take over the power provision of the IPC accordingly.

Further, the power management controller may detect a presence of the second electronic component in the second housing module and control the supply of electric power to the IPC accordingly.

The power management controller may also control a power distribution of the IPC such that during a removal or insertion of the second electronic component, the internal electric power distribution remains unaffected. In particular, the second electronic component (UPS device) can be removed or inserted while the IPC is running without affecting the operation of the IPC. The second electronic component is for example inserted or removed when the second housing module is stacked to the first housing module or removed therefrom.

The power management controller may control a charging of the UPS device by the internal electric power supply device. For example, it can control a rate of charge of the UPS device depending on a result of the monitoring of the internal electric power supply.

The power management controller may further control a shutdown and/or boot operation of the IPC. For example, when the power management controller determines that the internal electric power supply device fails and/or is disconnected from the IPC, the power management controller may control the UPS device to take over the powering of the IPC and may further initiate a shut down of the IPC. The shutdown may be initiated when a capacity of the UPS device becomes insufficient, in particular when it falls below a certain threshold. In particular, the shutdown operation is a safe shutdown operation in which it is ensured that no data is lost.

Further, the power management controller may control a boot operation of the IPC when it recognizes that the internal electric power supply device has been reconnected to the IPC and/or that it is operating correctly.

According to a further embodiment, the connection bus is further implemented to transmit control signals between the housing modules and/or the electronic components. In particular, the control signals are signals emitted by the power management controller. The control signals may also be signals emitted by a central processing unit of the IPC for controlling the power management controller.

According to a further embodiment, the connection bus comprises a PCI bus, a PCI express bus, a USB protocol bus and/or a $I^2c$ protocol bus. Herein, PCI stands for "Peripheral Component Interconnect" and USB stands for "Universal Serial Bus".

According to a further embodiment, the first and the second housing module are stacked on top of each other along the stacking direction and surfaces of the first and second housing module that face each other have same dimensions. The first and the second housing modules may both be rectangular cuboids, in particular having bases of the same size.

According to a further embodiment, the second housing module comprises a drawer having the second electronic component with a connection port, a slot for receiving the drawer and an opening through which the drawer is insertable into the slot along an insertion direction that is perpendicular to the stacking direction, wherein the connection port and the second electric connection portion electrically couple to each other when the drawer is arranged in the slot.

The second electronic component (the UPS device) may comprise a connection port. It can be inserted into the second housing module using the drawer of the second housing module. In a state in which the drawer holding the second electronic component is inserted in the slot, the connection port of the second electronic component couples or engages with the second electric connection portion. The UPS device can easily be inserted into the second housing module and removed therefrom using the drawer. Providing the second housing module with the drawer can thus facilitate the flexible provision of the IPC with the UPS device.

According to a further embodiment, the second housing module further comprises at least one additional drawer including an additional electronic component and at least one additional opening through which the additional drawer is insertable.

The second housing module may comprise at least one additional drawer for inserting the additional electronic component. The additional electric component may include an additional connection port that is oriented such as to connect with the second electric connection portion when the additional drawer is inserted in an additional slot of the second housing module. In embodiments, the additional drawer is inserted into the second housing module along a direction opposed to the insertion direction. The additional drawer allows to easily add the additional electronic component to the second housing module, thereby improving the functionalities of the IPC further.

According to a further embodiment, the additional electronic component comprises the power management controller.

According to a further embodiment, the IPC comprises at least three housing modules stacked to each other, wherein the first housing module comprises a motherboard of the IPC as the first electronic component, the second housing module comprises the UPS device as the second electronic component and the third housing module comprises a cooling device for cooling the first and/or second housing modules.

For example, the IPC comprises the second housing module as a lowest layer, the third housing module as an upper layer and the first housing module provided between the second and the third housing module. The cooling device can ensure that the other housing modules do not overheat and thereby ensure that they function correctly. In embodiments, the IPC further includes a fourth housing module for holding further electronic components of the IPC.

According to a further embodiment, the first, second and/or third housing module have a cuboid shape and/or wherein sizes of the first, second and/or third housing module are equal to one another.

According to a further embodiment, the UPS device is adapted to provide an internal emergency power.

According to a second aspect, a housing module for an IPC according to the first aspect or according to an embodiment of the first aspect is provided, the housing module comprising a connection portion and an electronic component which is a UPS device. In particular, the housing module corresponds to the above-described second housing module. In embodiments, it includes the drawer described above.

According to a third aspect, a method for manufacturing an IPC is provided. The method comprises:

stacking a first housing module and a second housing module of the IPC along a stacking direction, the first housing module having a first electronic component, an internal electric power supply device and a first electric connection portion and the second housing module having a second electric connection portion and a second electronic component, such that the first and second electric connection portions form a connection bus along the stacking direction for transmitting electric power between the first and second housing module; wherein the second electronic component is a UPS device.

In embodiments, the method according to the third aspect is used to manufacture the IPC according to the first aspect or according to an embodiment of the first aspect.

The embodiments and features described with reference to the IPC according to the first aspect or according to an embodiment of the first aspect apply mutatis mutandis to the method according to the third aspect.

Further possible implementations or alternative solutions of the invention also encompass combinations—that are not explicitly mentioned herein—of features described above or below with regard to the embodiments. The person skilled in the art may also add individual or isolated aspects and features to the most basic form of the invention.

Figure 2:
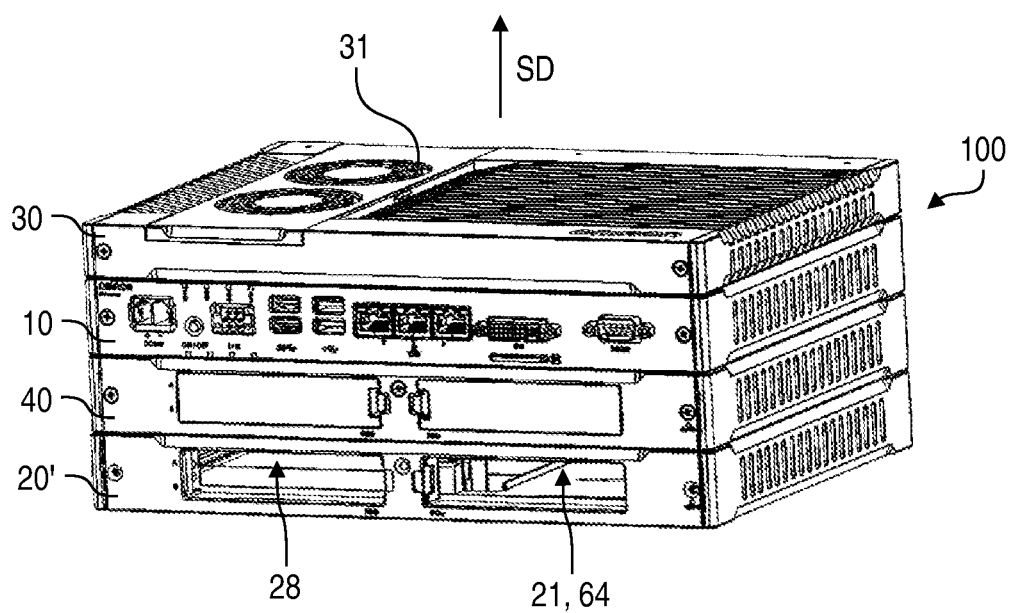
Figure 3A:
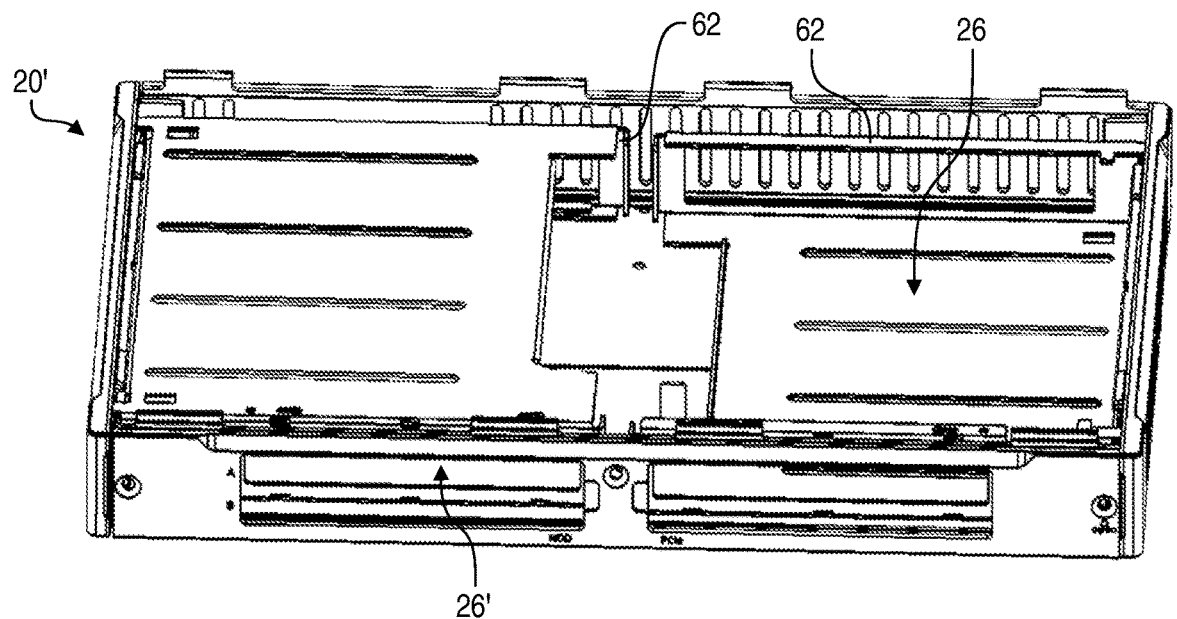
Figure 3B:
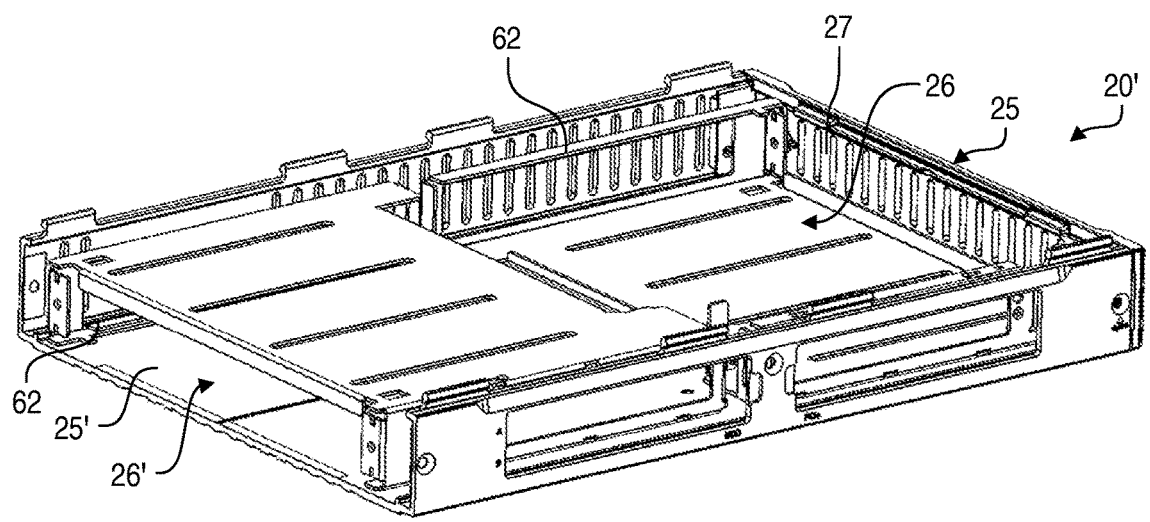
Figure 4:
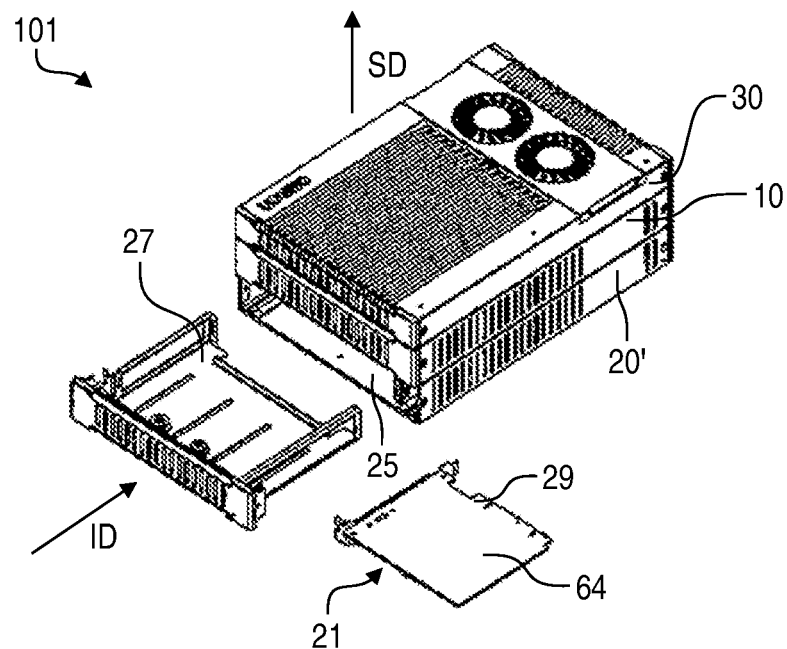
Figure 5:
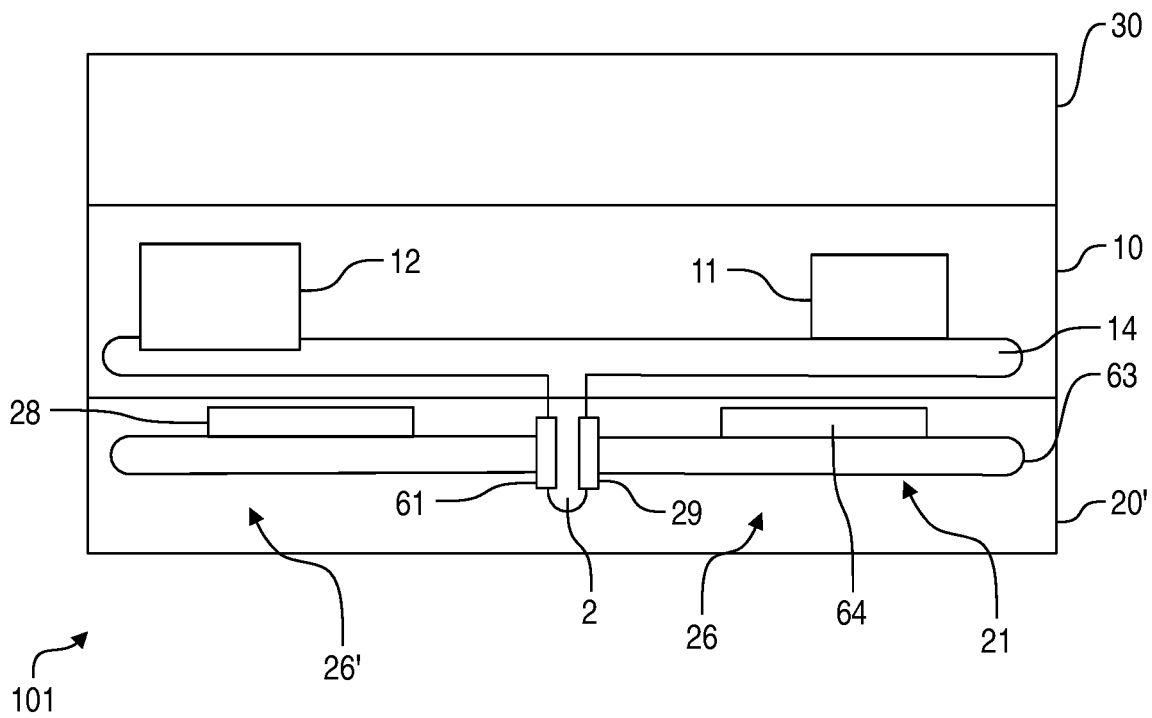
Figure 6:
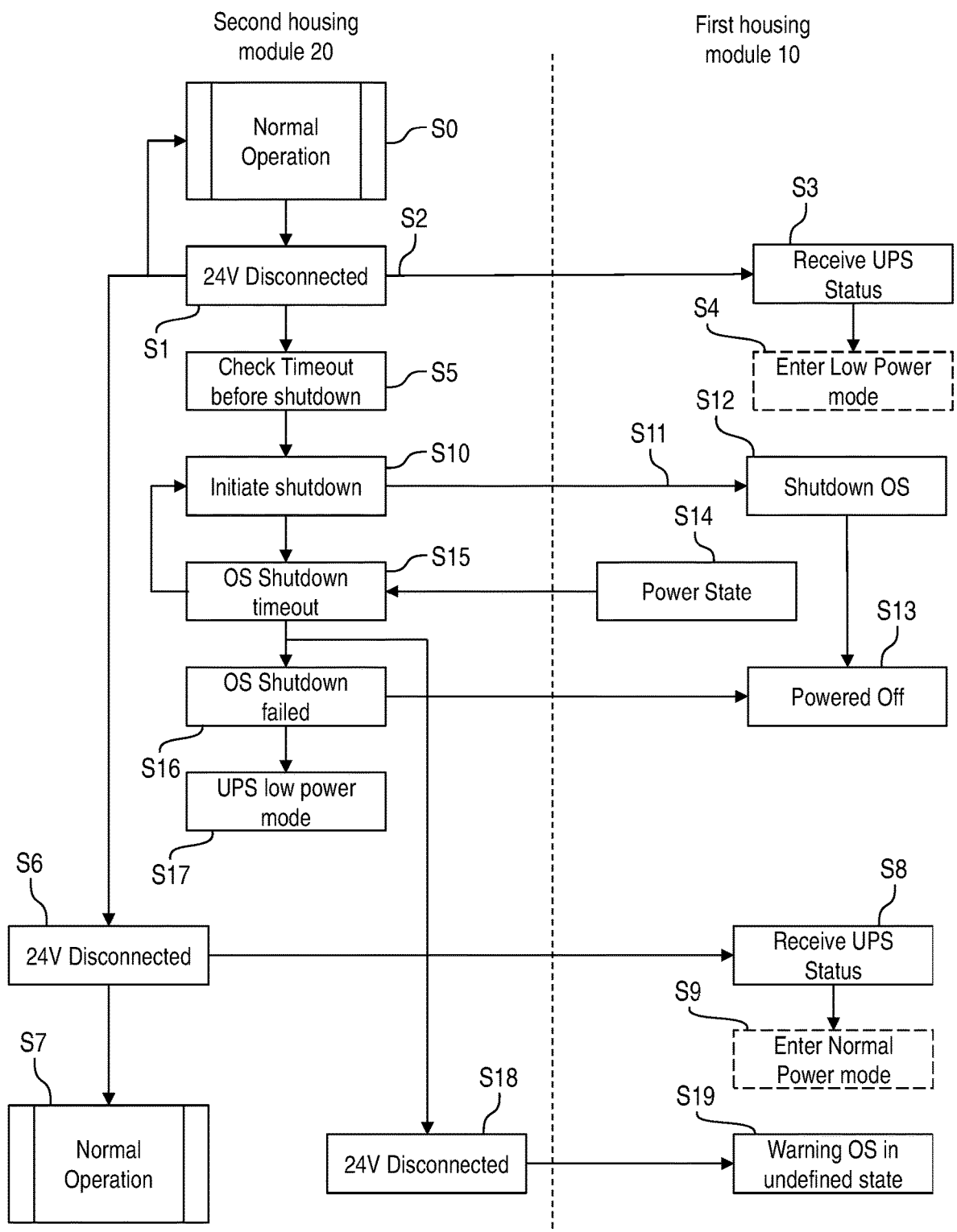
Figure 7:
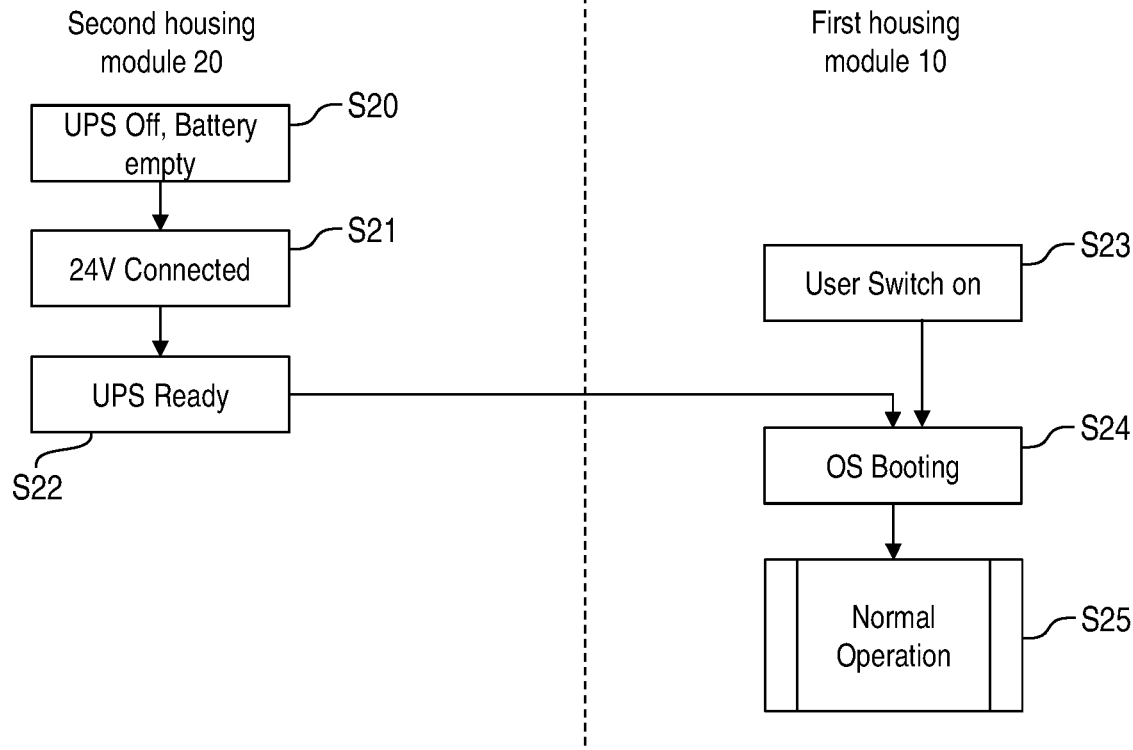
Figure 8:
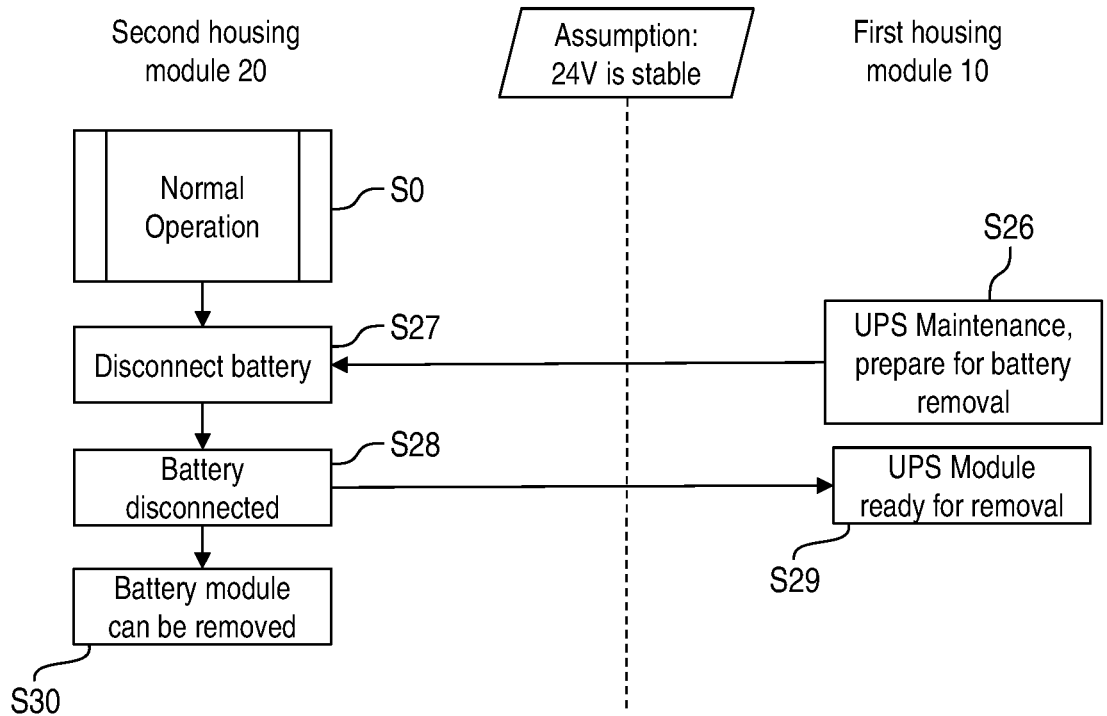
Figure 9:
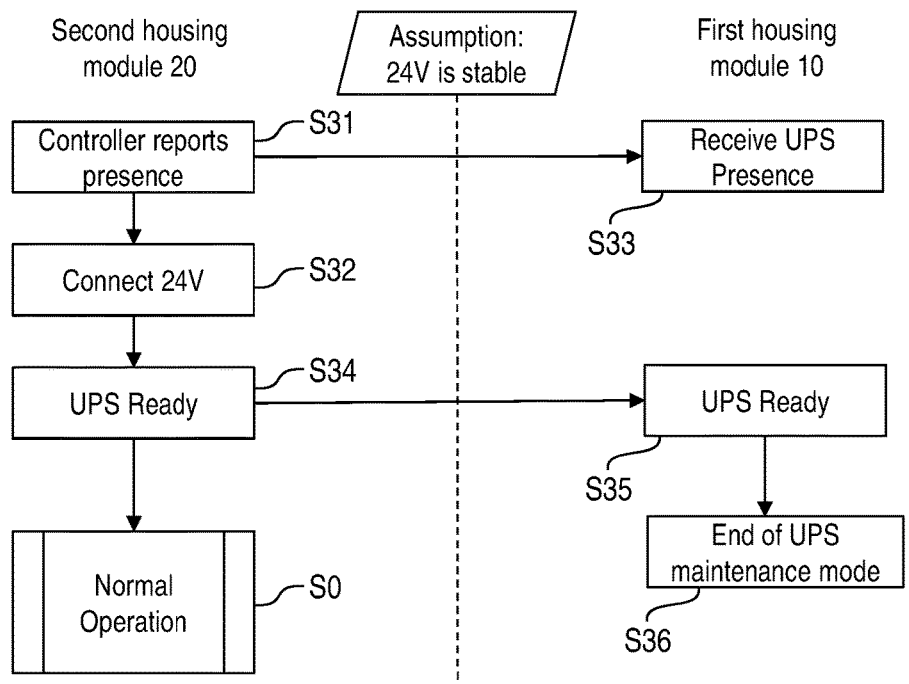
Figure 10:
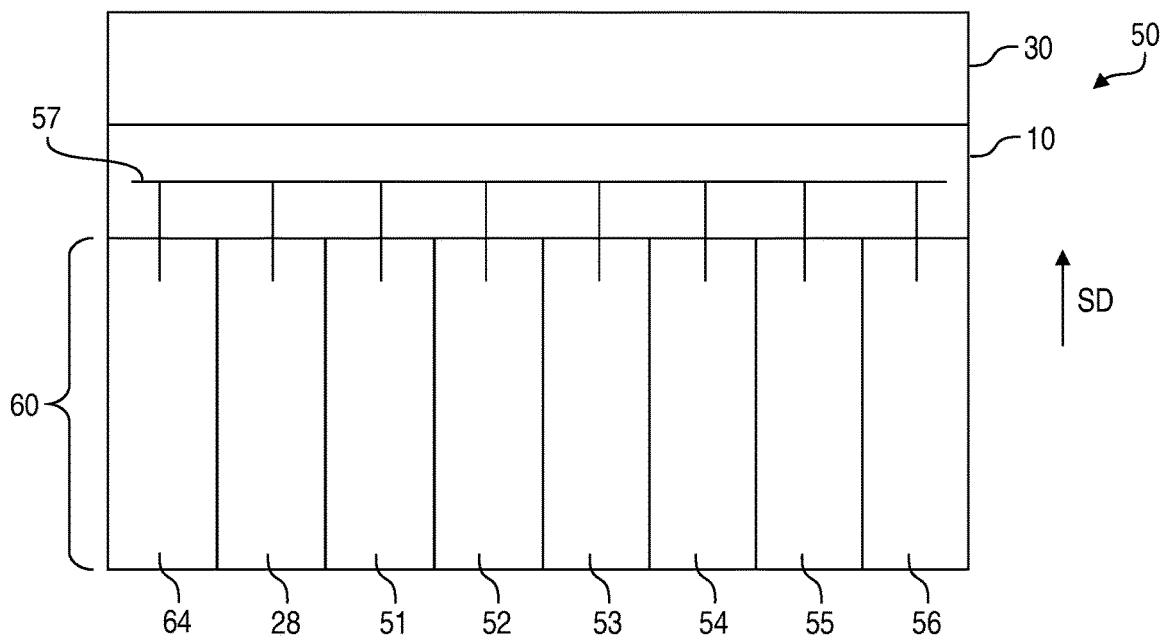

Further embodiments, features and advantages of the present invention will become apparent from the subsequent description and dependent claims, taken in conjunction with the accompanying drawings, in which:

FIG. 1 shows an IPC according to a first embodiment;
FIG. 2 shows an IPC according to a second embodiment;
FIGS. 3A and 3B show an example of a second housing module;
FIG. 4 shows an IPC according to a third embodiment;
FIG. 5 shows an example of connections within the IPC according to the second embodiment;
FIG. 6 shows a first example of an operation of an IPC;
FIG. 7 shows a second example of an operation of an IPC;
FIG. 8 shows a third example of an operation of an IPC;
FIG. 9 shows a fourth example of an operation of an IPC; and
FIG. 10 shows an IPC according to a fourth embodiment.

In the Figures, like reference numerals designate like or functionally equivalent elements, unless otherwise indicated.

FIG. 1 shows a plan view of an industrial personal computer (IPC) 1 according to a first embodiment. The IPC 1 comprises a first housing module 10 and a second housing module 20 stacked on top of each other along a vertical stacking direction SD.

The first housing module 10 comprises a first electronic component 11, an internal electric power supply device 12 and a first electric connection portion 13. The first electric component 11 and the internal electric power supply device 12 are connected to the first electric connection portion 13 through a first internal bus 14.

The first electronic component 11 is a motherboard of the IPC 1. The first housing module 10 thus forms a main housing module of the IPC 1. The internal electric power supply device 12 is an internal battery of the IPC 1 which provides the entire IPC 1 with electric power in a normal operation state.

The second housing module 20 forms an additional housing module or additional layer of the IPC 1. It is removeable attachable to the first housing module 10. The second housing module 20 comprises a second electronic component 21 and a second electric connection portion 23 connected to each other through a second internal bus 24. The second electronic component 21 is a UPS device. The UPS device 21 includes a UPS battery.

In the stacked state shown in FIG. 1, the first and second electric connection portions 13, 23 couple such as to form a connection bus 2 along the stacking direction SD. The connection bus 2 is a PCI bus. The connection bus 2 allows a transmission of electric power between the first housing module 10 and the second housing module 20. In detail, the UPS battery of the UPS device 21 gets charged by a 24V current provided by the internal battery 12 through the connection bus 2.

Further, the UPS battery of the UPS device 21 can provide the entire IPC 1 with electric power through the connection bus 2 when the internal battery 12 fails and/or is disconnected from the IPC 1. Thereby, an interruption of power of the IPC 1 can be prevented, rendering the operation of the IPC 1 more reliable.

FIG. 2 shows an IPC 100 according to a second embodiment. The IPC 100 comprises the first housing module 10 already described in view of FIG. 1, a second housing module 20', a third housing module 30 and a fourth housing module 40.

Beyond the elements of the second housing module 20, the second housing module 20' comprises a power management unit 28 for controlling the UPS battery 64 of the UPS device 21.

The third housing module 30 is a cooling layer and forms the upper layer of the IPC 100. It comprises a cooling device 31 with cooling fans for cooling the remaining housing modules 10, 20' and 40 of the IPC 100. The fourth housing module 40 is arranged between the first housing module 10 and the second housing module 20'. It comprises a fourth electric component (not shown) and is connected to the first and second housing modules 10, 20' by means of a fourth electric connection portion (not shown) forming the connection bus 2 together with the first and second electric connection portions 13, 23.

As shown in FIG. 2, each housing module has the shape of a rectangular cuboid, with the surfaces of the housing modules 10, 20', 30, 40 that contact each other in the stacked state having same dimensions. The IPC 100 itself has the shape of a rectangular cuboid. Each housing module 10, 20', 30, 40 can individually be removed or added to the IPC 100 as desired. Thereby, a very modulable IPC 100 is provided. In particular, the UPS device 21 can be easily added to an existing IPC 100 by adding the second housing module 20' as an additional layer.

FIGS. 3A and 3B show an example of the second housing module 20'. The second housing module 20' comprises an opening 25 and an additional opening 25' located on opposite faces of the second housing module 20'. On the inside of the second housing module 20', a slot 26 and an additional slot 26' are provided for respectively receiving a drawer 27 and an additional drawer 27'. The drawer 27 and the additional drawer 27' are respectively insertable into the second housing module 20' through the openings 25 and 25'.

FIG. 4 shows an IPC 101 according to a third embodiment. The IPC 101 is identical to the IPC 100 according to the second embodiment with the exception that it does not comprise the fourth housing module 40. Instead, the first and second housing modules 10, 20' are directly contacting each other in the IPC 101.

FIG. 4 shows how the drawer 27 is inserted into the second housing module 20' through the opening 25. In detail, the drawer 27 is pushed into the second housing module 20' through the opening 25 along an insertion direction ID, which is horizontal or perpendicular to the stacking direction SD. Inside the second housing module 20', the drawer 27 is guided along guidance rails 62 (FIGS. 3A and 3B).

The UPS device 21 comprising the UPS battery 64 is inserted into the second housing module 20' by placing it into the drawer 27. As shown in FIG. 4, the UPS device 21 includes a connection port 29 on one end side thereof. When the UPS device 21 is placed inside the drawer 27 and inserted into the second housing module 20', the connection port 29 couples with the first electric connection portion 13 of the second housing module 20' when the drawer 27 is fully inserted into the second housing module 20'.

The additional drawer 27' can be inserted into the additional slot 26' in a similar fashion. Namely, it is inserted into the second housing module 20' through the additional opening 25' along a direction that is opposite to the insertion direction ID. The additional drawer 27' holds the power management controller 28 as an additional electronic component.

FIG. 5 shows an example of connections within the IPC 101. The second housing module 20' includes the UPS device 21 comprising a UPS battery 64 and the connection port 29 provided on a circuit board 63 and inserted inside the slot 26 of the second housing module 20'.

The connection port 29 couples with the connection bus 2. The connection bus 2 extends vertically along the stacking direction SD through the first and second housing modules 10, 20', thereby electrically connecting the first housing module 10 and the second housing module 20'.

Further, in FIG. 5, the power management controller 28 is arranged in the additional slot 26' of the second housing module 20'. An additional connection port 61 couples with the connection bus 2 and electrically connects the power management controller 28 with the connection bus 2 through a printed circuit board 65. The internal battery 12 of the IPC 101 powers the power management controller 28 through the connection bus 2.

The connection bus 2 is used to transmit control signals and electric power between the housing modules 10, 20'. The transmission of the control signals and of the electric power is coordinated by the power management controller 28, the functionality of which will be described with reference to FIG. 6-9 below.

FIG. 6 shows a first example of an operation of the IPC 101, in which the internal battery 12 of the IPC 101 is disconnected. In a step S0, the IPC 101 operates correctly. This means that the internal battery 12 provides the entire IPC 101 with electric power. In particular, the internal battery 12 provides a 24V voltage to the UPS device 21 and to the power management controller 28 via the connection bus 2.

In a step S1, the internal battery 12 is disconnected from the IPC 101. This disconnection is detected by the power management controller 28 of the UPS device 21, which detects an interruption of the 24V voltage. In view of the disconnection of the internal battery 12, the power management controller 28 sends a status information to the motherboard 11 of the first housing module 10, indicating the disconnection of the internal battery 12 in a step S2. This status information is transmitted through the connection bus 2.

In as step S3, the motherboard 11 receives the status information. In a step S4, the IPC 101 enters a low power mode in view of the received status information indicating a disconnection of the internal battery 12.

In a step S5, the power management controller 28 determines how much time remains before a shutdown of the IPC 101 has to be initiated. The remaining amount of time can be determined based on the state of charge of the UPS device 21.

If the internal battery 12 is connected before the remaining time has lapsed, namely when the power management controller 28 detects that the 24V voltage from the internal battery 12 is back (step S6), the power management controller 28 sends a status update to the motherboard 11, indicating that the internal battery 12 is connected. The motherboard receives this status information in a step S8 and accordingly, the IPC 101 enters the normal power mode in a step S9.

However, if the internal battery 12 is not connected before the remaining time has lapsed, the power management controller 28 initiates a shutdown of the IPC in a step S10. This is done by sending a shutdown command through the connection bus 2 for shutting down the operating system (OS) in a step S11. The shutdown operation itself is performed by the motherboard 11 in a step S12, eventually leading to the IPC 101 being powered-off (step S13).

The power management controller 28 can determine an error in shutdown if it receives an indication from the motherboard indicating that the IPC 101 is still in a powered state (step S14) when the shutdown has timed out (step S15). In this case, the power management controller can re-initiate the shutdown (step S10). If the shutdown repeatedly fails, the power management controller 28 determines that the shutdown failed in a step S16 and instructs the motherboard 11 to directly power-off the IPC 101. In a step S17, the UPS device 21 enters a low power mode to avoid using all its power supply.

FIG. 7 shows a second example of an operation of the IPC 101, in which the internal battery 12 is reconnected to the IPC 101, but in which the UPS battery 64 is empty.

In a step S20, the UPS battery 64 is empty. In a step S21, the internal battery 12 is reconnected, providing the UPS battery 64 with the 24V voltage via the connection bus 2.

In a step S22, the UPS battery 64 has reached a sufficient state of charge to operate: the UPS device 21 is ready for use. Meanwhile, in a step S23, a user has switched-on the IPC 101. When the IPC 101 is switched on and the UPS device 21 is ready, the operating system of the IPC 101 boots in a step S24.

In particular, the booting of the OS is not performed before the UPS device 21 is ready to avoid undesired interruptions in the booting process. Then, in a step S25, the IPC 101 operates normally, with the internal battery 12 providing the IPC 101 with electric power and the UPS device 21 ready to operate in an emergency situation.

FIG. 8 shows a third example of an operation of the IPC 101, in which the UPS battery 64 is removed from the IPC 101, for example for maintenance. In a step S0, the IPC 101 operates normally, as described above.

In a step S26, the motherboard 11 determines that a maintenance of the UPS battery 64 is necessary and initiates the same by entering a maintenance mode. In a step S27, the power management controller 28 prepares the UPS battery 64 and the entire UPS device 21 to be disconnected from the IPC 101 and performs disconnection. Once disconnection is done (step S28), the motherboard 11 is informed thereof (step S29) and the UPS device 21 is removed from the IPC 101 by pulling the drawer 27 out of the second housing module 20' and removing the UPS device 21 from the drawer 27.

The steps S26 to S30 are performed with the IPC 101 still running. In detail, the UPS device 21 is removed from the IPC 101 without interrupting the IPC 101, at a stable 24V voltage along the connection bus 2.

FIG. 9 shows a fourth example of an operation of the IPC 101, in which the UPS device 21 is inserted into the IPC 101 by inserting the drawer 27 into the second housing module 20', as described. In a step S31, the power management controller 28 reports the presence of the UPS device 21 by sending a message to the motherboard 11 via the connection bus. The motherboard 11 receives the message indicating that the UPS device 21 is connected in a step S33.

In a step S32, the 24V voltage supplied through the connection bus 2 is connected to the UPS device 21. Once the UPS battery 64 has sufficiently charged, the UPS device 21 becomes ready for use in a step S34. The power management controller 28 indicates that the UPS device 21 is ready by sending an appropriate message to the motherboard 11, which receives said message in a step S35. Accordingly, the motherboard 11 ends the maintenance mode in a step S36 and the IPC 101 operates normally in step S0.

Thus, the UPS device 21 can be easily inserted into the IPC 101 while the IPC 101 is running.

FIG. 10 shows an IPC 50 according to a fourth embodiment. The IPC 50 differs from the IPC 101 in that it comprises a second housing module 60 having eight drawers in which a UPS battery 64 (second electronic component), a power management controller 28, a hard disk drive 51, a PCI express additional card 52, another UPS battery 53, another power management controller 54, as well as two additional electronic components 55 and 56 are respectively arranged as electronic components. Each of the electric components 64, 28, 51-56 is connected to the first housing module 10 via a connection bus 57. The connection bus is a PCI express bus.

Although the present invention has been described in accordance with preferred embodiments, it is obvious for the person skilled in the art that modifications are possible in all embodiments. For example, although the operation examples (FIGS. 6 to 9) have been described in view of the IPC 101, the IPCs 1, 50 and 100 can be operated accordingly. Further, the UPS device 21 and the power management controller 28 can be inserted into the second housing module 20' in the same drawer 27.

The invention claimed is:

1. An industrial personal computer (IPC) (1, 50, 100, 101) comprising: a first housing module (10) having a first electronic component (11), an internal electric power supply device (12) and a first electric connection portion (13); and a second housing module (20, 20') having a second electronic component (21) and a second electric connection portion (23), the first and the second housing modules (10, 20, 20') being stacked along a stacking direction (SD), wherein the first and second electric connection portions (13, 23) form a connection bus (2) along the stacking direction (SD) at least for transmitting electric power between the first and second housing modules (10, 20, 20'); wherein the second electronic component (21) is an uninterruptible power supply (UPS) device; and the IPC (1, 50, 100, 101) further comprising a power management controller (28) implemented to: monitor the internal electric power supply device (12) and/or an internal voltage at the connection bus (2); detect a presence of the second electronic component (21) in the second housing module (20, 20'); control a power distribution of the IPC (1, 50, 100, 101) such that during a removal or insertion of the second electronic component (21) the internal electric power distribution remains unaffected; control a charging of the UPS device (21) by the internal electric power supply (12); ands control a shutdown and/or boot operation of the IPC (1, 50, 100, 101).

2. The IPC according to claim 1, wherein the UPS device (21) is configured to provide the IPC (1, 50, 100, 101) with electric power through the connection bus (2) when the internal electric power supply device (12) fails and/or is disconnected such that an interruption of the power supply of the IPC (1, 50, 100, 101) is prevented.

3. The IPC according to claim 1, wherein the connection bus (2) is further implemented to transmit control signals between the housing modules (10, 20, 20') and/or the electronic components (11, 21).

4. The IPC according to claim 3, wherein the connection bus (2) comprises a PCI bus, a PCI express bus, a USB protocol bus and/or a I$^2$c protocol bus.

5. The IPC according to claim 1, wherein the first and the second housing modules (10, 20, 20') are stacked on top of each other along the stacking direction (SD) and surfaces of the first and second housing modules (10, 20, 20') that face each other have same dimensions.

6. The IPC according to claim 1, wherein the second housing module (20, 20') comprises a drawer (27) having the second electronic component (21) with a connection port (29), a slot (26) for receiving the drawer (27) and an opening (25) through which the drawer (27) is insertable into the slot (26) along an insertion direction (ID) that is perpendicular to the stacking direction (SD), wherein the connection port (29) and the second electric connection portion (23) electrically couple to each other when the drawer (27) is arranged in the slot (26).

7. The IPC according to claim 6, wherein the second housing module (20, 20') further comprises at least one additional drawer (27') including an additional electronic component (51-56) and at least one additional opening (25') through which the additional drawer (27') is insertable.

8. The IPC according to claim 7, wherein the additional electronic component (51-56) comprises the power management controller (28).

9. The IPC according to claim 1, comprising at least three housing modules (10, 20, 20', 30, 40) stacked to each other, wherein the first housing module (10) comprises a motherboard of the IPC (1, 50, 100, 101) as the first electronic component (11), the second housing module (20, 20') comprises the UPS device (21) as the second electronic component (21) and the third housing module (30) comprises a cooling device (31) for cooling the first and/or second housing modules (10, 20, 20').

10. The IPC according to claim 1, wherein the first, second and/or third housing modules (10, 20, 20', 30) have a cuboid shape and/or wherein sizes of the first, second and/or third housing modules (10, 20', 20, 30) are equal to one another.

11. The IPC according to claim 1, wherein the UPS device (21) is adapted to provide an internal emergency power.

12. A housing module for an IPC (1, 50, 100, 101) according to claim 1 comprising an electric connection portion (13, 23) and an electronic component (21) which is a UPS device.

13. A method for manufacturing an IPC (1, 50, 100, 101), comprising: stacking a first housing module (10) and a second housing module (20, 20') of the IPC (1, 50, 100, 101) along a stacking direction (SD), the first housing module (10) having a first electronic component (11), an internal electric power supply device (12) and a first electric connection portion (13) and the second housing module (20, 20') having a second electric connection portion (23) and a second electronic component (21), such that the first and second electric connection portions (13, 23) form a connection bus (2) along the stacking direction (SD) for transmitting electric power between the first and second housing module (20, 20'); wherein the second electronic component (21) is a UPS device; and the IPC (1, 50, 100, 101) further comprises a power management controller (28) performing: monitoring the internal electric power supply device (12) and/or an internal voltage at the connection bus (2); detecting a presence of the second electronic component (21) in the second housing module (20, 20'); controlling a power distribution of the IPC (1, 50, 100, 101) such that during a removal or insertion of the second electronic component (21) the internal electric power distribution remains unaffected; controlling a charging of the UPS device (21) by the internal electric power supply (12); ands controlling a shutdown and/or boot operation of the IPC (1, 50, 100, 101).

14. A method for manufacturing the IPC (1, 50, 100, 101) according to claim 1, comprises:
stacking the first housing module (10) and the second housing module (20, 20') of the IPC (1, 50, 100, 101) along the stacking direction (SD), such that the first and second electric connection portions (13, 23) form the connection bus (2) along the stacking direction (SD) for transmitting electric power between the first and second housing module (20, 20').

15. An automation network comprising an IPC (1, 50, 100, 101) according to claim 1, wherein the IPC (1, 50, 100, 101) is implemented to control at least one controllable automation device communicatively coupled to the IPC (1, 50, 100, 101) through a communications network.

16. The IPC according to claim 2, wherein the connection bus (2) is further implemented to transmit control signals between the housing modules (10, 20, 20') and/or the electronic components (11, 21).

17. The IPC according to claim 16, wherein the connection bus (2) comprises a PCI bus, a PCI express bus, a USB protocol bus and/or a I$^2$c protocol bus.

18. The IPC according to claim 2, wherein the first and the second housing modules (10, 20, 20') are stacked on top of each other along the stacking direction (SD) and surfaces of the first and second housing modules (10, 20, 20') that face each other have same dimensions.

19. The IPC according to claim 3, wherein the first and the second housing modules (10, 20, 20') are stacked on top of each other along the stacking direction (SD) and surfaces of the first and second housing modules (10, 20, 20') that face each other have same dimensions.

20. The IPC according to claim 16, wherein the first and the second housing modules (10, 20, 20') are stacked on top of each other along the stacking direction (SD) and surfaces of the first and second housing modules (10, 20, 20') that face each other have same dimensions.

\* \* \* \* \*